April 7, 1964 W. K. LANDES 3,128,065
HEAVY DUTY AIRCRAFT SKI
Filed May 15, 1961
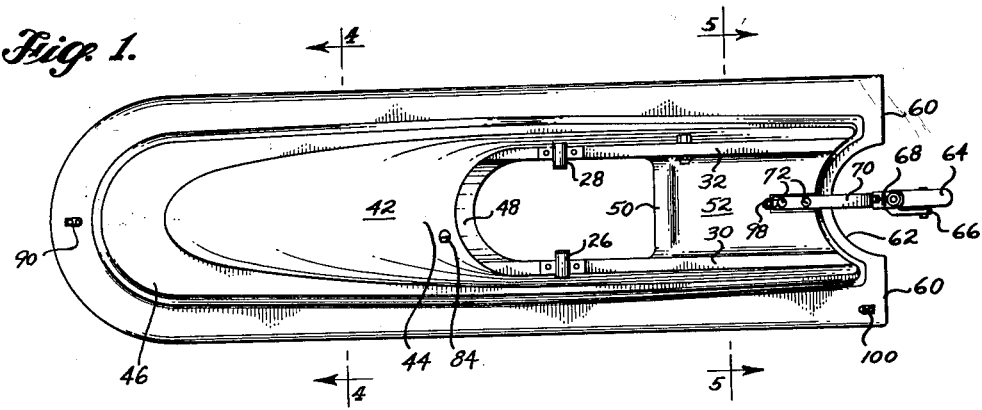
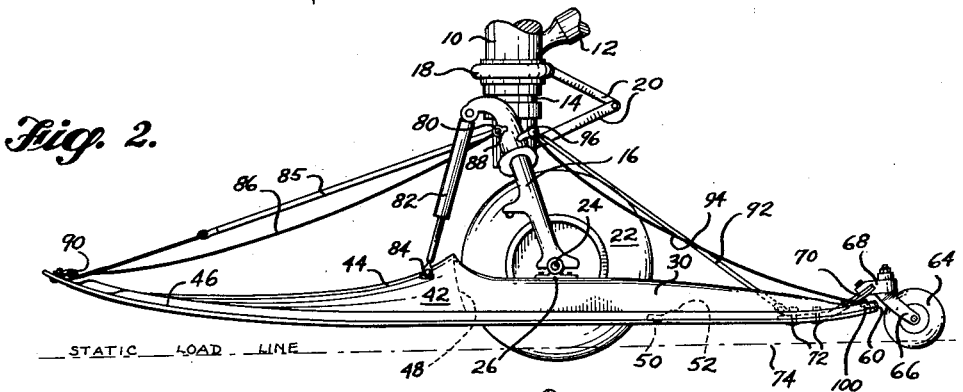
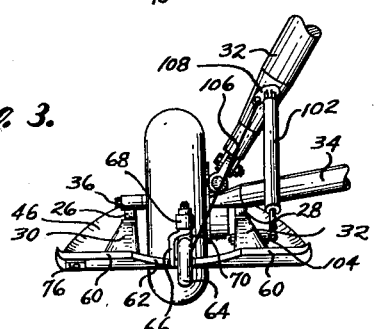
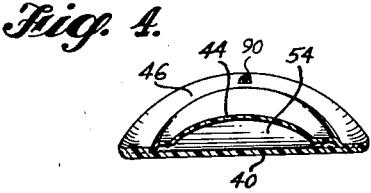
INVENTOR.
WESLEY K. LANDES
BY Mathis and Graybeal
ATTORNEYS

United States Patent Office 3,128,065
Patented Apr. 7, 1964

3,128,065
HEAVY DUTY AIRCRAFT SKI
Wesley K. Landes, P.O. Box 1254, Anchorage, Alaska
Filed May 15, 1961, Ser. No. 109,948
17 Claims. (Cl. 244—108)

The present invention relates to aircraft skis, and more particularly relates to such skis as adapted for heavy duty use such as on helicopters and the like.

In certain embodiments, an aircraft ski according to the invention has a spring loaded, full swivel tail wheel for protecting the rearward runner surface from touch-down and ground maneuvering abrasion. Also, either alternatively or conjunctively, certain advantageous adaptations of the invention are characterized by a cushioning pedestal construction of the ski, including a wheel well for receiving a landing gear wheel. This latter constructional feature involves a hollow, thin walled pedestal area having an inherent resiliency by virtue of being constructed essentially entirely of synthetic resin impregnated with glass fibers, the hollow or interspace between the pedestal portion and runner portion of the ski surrounding the wheel well.

In its utilization of a hollow pedestal surrounding an aircraft landing gear axle mount, the present invention constitutes an improvement and heavy duty adaptation of the inventions disclosed and claimed in my earlier U.S. Patents 2,950,883 and 2,961,362, and the basic ski construction and characteristics, as well as suitable methods of fabricating such skis, are disclosed in said earlier patents, to which reference should be made for a more detailed discussion of these aspects.

As a refined feature of the ski construction here disclosed, the rearward portion of the ski incorporates a pedestal configuration providing a channel of reduced thickness dimension rearwardly of the wheel well and lying between two rearwardly extending pedestal ridges, such channel enabling installation or removal of a ski from a landing gear wheel without jacking.

Customarily, usage of skis on an aircraft, such as a helicopter, renders the craft awkward or even difficult to ground maneuver and seriously limits the extent to which running landings and take-offs can be used. Rollers at the rear tips of landing skids have been proposed, as in Bensen U.S. Patent 2,905,410, but such do not allow for full ground maneuverability. Even when the skis are used in conjunction with fixed penetration landing wheels, the rear tips of the skis scrape unduly and can break or wear through in an undesirably short time.

There is an imperative need for an aircraft ski which is light, yet strong, and capable of usage with a minimum of danger on about any type of terrain presented. For example, with heavy duty helicopters in arctic regions, landings and take-offs are called for on concrete runways, bare ground, snow, swampy marshes, muskeg, and the like. For snow, swampy areas and muskeg, a so-called "flotation" device such as a ski is essential, otherwise the landing gear wheels bog down and as a consequence often prevent any degree of running landing or take-off without danger of landing gear failure. However, the ideal rough terrain "flotation" device or ski must not be of a nature to add considerable dead weight and thus detract from effective payload of the craft, and must not interfere with hard surface, i.e. runway, landings and take-offs, and not interfere with hard surface taxiing or maneuvering.

To illustrate some of the problems involved in rough terrain operations, and to demonstrate some of the advantages of skis according to the present invention, reference is invited to an article entitled "Skis For The Shawnee" in the United States Army Aviation Digest, issue of November 1960, beginning at page 27. This article typically describes an emergency installation and operational use of the type of skis here disclosed on a U.S. Army H–21C helicopter, and in part discusses the operational need for such skis as evolved by the present invention.

Paraphrasing and summarizing some of the observations of said article, note is made of the sturdy synthetic resin impregnated with glass fiber construction of the skis, of their ease of installation without jacks, of the observation that the weight of the skis did not noticeably change the flight characteristics of the helicopter, of a landing made on a gravel runway just as though the skis were not installed, of the ski arrangement where the main wheels protrude below the skis several inches and the small tail wheels on the rear of the skis protect the ski bottoms from being damaged, and of the maneuvering of the craft by autorotation to a landing on a hard surface with the tail wheels touching down prior to the main gear and thus protecting the skis. This article also discusses a type of previously used flotation device (plywood boards set underneath the V braces) which did not adequately keep the seven ton craft from sinking into the snow, necessitating use of the supercharger on "high blower" for lift off. This is a serious operational limitation in that the supercharger high blower must then be used for takeoffs at elevations above 10,000 feet. There is comment also as to a U.S. Army Aviation School Combat Development Office study which revealed the need for adequate flotation devices to permit helicopter operation on snow or muskeg, concluding that adequate skis were the only devices that can provide both desired flotation and ability to slide over snow, consistent with adequate ground handling, taxiing and running take-off and landing requirements, noting also that during the summer muskeg or swamp areas are extremely rough and consist of large clumps of grass massing on the surface, with crevasses up to six feet deep located between clumps, making customary helicopter landings extremely hazardous since conventional type gear tends to slip off the grass and into the crevasses, upsetting the craft. This article observes also that, without skis, helicopters operating in deep snow must land and take off from a hover, and with light and powdery snow the rotor downwash creates a blinding blizzard often causing vertigo or whiteout, and that skis which enable running landings and take-offs would eliminate the hover requirement and minimize this problem.

Thus, skis according to the present invention afford an improved operational capability in swampy or muskeg terrain, and provides along with such capability optimal lightness yet adequate strength and an inherent self-cushioning (by its hollow pedestal), for example, all without hampering hard surface landing, take-off or taxiing maneuverability and without generating any substantial amount of runner abrasive wear.

These and other capabilities, features, advantages and objects of the present invention will be apparent from the following description of a typical form thereof, as adapted for heavy helicopter use, taken together with the accompanying illustrations, wherein like numerals refer to like parts, and wherein:

FIG. 1 is a plan view of a ski according to the present invention;

FIG. 2 is a view in side elevation of the ski shown in FIG. 1, as mounted on a typical helicopter front, steered landing gear wheel;

FIG. 3 is a view in rear elevation of the ski of FIG. 1, as mounted on a helicopter rear, non-steered landing gear wheel;

FIG. 4 is a lateral, cross sectional view of the ski shown in FIG. 1, taken substantially along line 4—4 thereof; and FIG. 5 is a lateral, cross sectional view of the ski shown in FIG. 1, taken substantially along line 5—5 thereof.

As will be understood, and as shown fragmentarily at FIGS. 2 and 3, a typical helicopter landing gear assembly, such as employed on the U.S. Army H–21C helicopter, comprises in the forward gear (FIG. 2) an oleo strut cylinder 10 joined by the V brace 12, with the oleo piston rod 14 terminating in a fork 16, the fork 16 being relatively non-rotative with the rotatable ring 18 by means of scissors linkages 20. The landing wheel assembly includes landing wheel 22 journaled in fork 16 and a stub axle assembly 24. Axle assembly 24 is in turn journaled in ski trunnions 26, 28 suitably secured as by bolts to the longitudinal pedestal ridges 30, 32 of the ski.

FIG. 3 presents fragmentarily a portion of the left rear landing gear of a helicopter, such as the H–21C. It will be recognized, of course, that such rearward landing gear is non-steerable, and that the right, rear landing gear arrangement is simply a reversal of the mechanism, which includes a main gear strut 32 and a V brace 34 joining the axle assembly 36 which is suitably an extension of the wheel axle, retained in trunnions 26, 28 of the ski.

As will be apparent, the ski illustrated in FIGS. 1–5 is in many respects functionally and constructionally like the type of ski disclosed in my aforesaid U.S. Patent 2,950,883 in that it comprises a laterally generally flat runner portion 40 integrally bonded around its edges to a sloping pedestal portion 42, which pedestal portion 42 in turn comprises forwardly and rearwardly extending, sloped ridges, the forwardly directed ridge 44 and the rearwardly directed ridges 30 and 32 being portions of a generally curved or domed contour which joins an outer pedestal portion 46 in turn lying generally parallel to but spaced from the runner portion 40, the function of said pedestal portion 46 being to enhance the flexural characteristics of the ski, and particularly the tip portion thereof (again note said prior Patent 2,950,883). In addition, the pedestal portion generally indicated at 42 comprises a generally uprightly extending wheel well wall 48 (FIGS. 1 and 2), the wheel well forming configuration of the ski also including the areas of ridges 30 and 32 joining with runner portion 40 (note FIG. 5) and an integrally bonded area forwardly terminated by edge 50 (again note FIG. 1 and the dotted line showing thereof at FIG. 2). As shown as FIGS. 3 and 5, the pedestal area behind the bond along said edge 50 and between ridges 30 and 32 comprises a pedestal wall area 52 which lies spaced from and slightly above runner portion 40, which area 52 is termable a wheel receiving channel or ramp. Such spacing between the rearwardly channel 52 and runner 40 will be seen to be a part of the hollow or interspace between the pedestal and runner portions of the ski, which interspace is designated in the illustrations at 54 (FIGS. 4 and 5) and entirely surrounds the landing gear axle supporting trunnions 26, 28, lying under pedestal portions 30, 32, 44, 46 and 52. Thus, it will be seen the illustrated ski has runner and pedestal portions integrally bonded together only about their outer edges and about the wheel well.

As an important feature of the ski, the central area of its rear edge 60 is inset, as at 62, and a full swiveling tail wheel assembly with vertically acting spring loading is provided. More specifically, such spring loaded, full swivel tail assembly suitably comprises a relatively small tail wheel 64 freely rotatable on offset arm 66 which is in turn fully rotatable in pivot block 68. Suitable spring loading means such as leaf spring 70 is anchored to the rear portion of channel 52, as by bolts 72, and said pivot block 68 is in turn mounted on the rear end of leaf spring 70, the disposition of the pivot block 68 being with its axis of rotation substantially coincident with the line of the ski rear edge 60 (note FIG. 2). With such arrangement, the tail wheel assembly is free to pivotally swivel in the area of inset 62 and does not extend substantially beyond the rear edge 60 of the ski in any attitude so as to not constitute an obstructional projection of the ski and so as to safeguard the spring mounting of the tail wheel against overstrain should the ski land with an abrupt tipped-up angle (a common landing attitude), the wheel and rear tip of the ski in such event sharing the shock.

FIG. 2 illustrates the normal attitude of landing wheel 22 and tail wheel 64 without static load, and also shows somewhat schematically the normal static or grounded load line, at 74. As will be understood, landing wheel 22 is customarily pneumatically inflated with a fixed penetration with respect to the ski, and will substantially flatten under load. Static load line 74 also demonstrates that there is under static load conditions a substantial deflection upwardly of tail wheel 64. Suitably, tail wheel 64 is of a type having a solid rubber rim, and the static loading deflection of the tail wheel assembly is accordingly primarily in flexing of spring 70, and primarily to the extent generated by the forwardly fastened shock cord assembly associated with the ski, as discussed below. However, under static load conditions, and under all but the most severe shock load conditions, the tail wheel assembly serves to keep the rear tip of the ski off the ground and, by virtue of its full swivel capability, permits as full maneuverability of the landing gear wheel as if such were not ski equipped.

Viewed in relation to the ski runner rear tip, and as shown at FIG. 2, the normal attitude of tail wheel 64 under no load or under static load condition is with the ground engaging rim of the tail wheel substantially below the runner surface, the spring loading arrangement nonetheless permitting upwardly retraction of the tail wheel against the force of spring 70 on the occasion of sharp ground engaging shock to a position where such tail wheel ground engaging rim is substantially level with the runner surface rear tip and shares the shock with the runner rear tip. In a suitable design, for example, the strength of leaf spring 70 has been selected to yield to the point of rear tip ground engagement upon the tail wheel encountering 2000 lbs. load.

The main landing gear assemblies of a helicopter are customarily designed to tilt laterally inwardly and down to the rear in flight, and to minimize wear at the rear tip outer edges incident to momentary contact thereof with the ground before the skis level, a small, easily replaceable, metal wear strip can be provided on the main gear skis, if desired, such as indicated in FIG. 3 at 76.

In a manner generally conventional per se, the installation of a ski according to the present invention on a landing gear wheel assembly also includes suitable rigging or arresting mechanism and associated accessories, such as bungee bracket 80, bungee assembly 82 led to eye bolt 84 on pedestal 42, such as shock cord assembly 85 and safety cable 86 led between eye bolt 88 on bracket 80 and tab 90 on the forward tip of the ski, and such as shock cord assembly 92 along with safety cable 94 led between ring 96 on bracket 80 and respective tabs 98 and 100 in the rear portion of the ski (FIGS. 2 and 3); and suitable corresponding assemblage on the main landing gear skis, as shown in FIG. 3, such as bungee cylinder 102 between main gear strut 32 and eye bolt assembly 104, and such safety cable 106 between tab 108 and tab 98 (FIG. 1).

When installing the ski, and assuming the tail wheel assembly has been removed or is not yet installed so channel or ramp 52 is clear, the ski is placed forwardly of the landing gear wheel 22 and the craft is moved to simply roll the wheel up over the channel 52 until it lodges in the wheel well. Then the trunnions 26, 28 are mounted on the wheel axle on the ski, the ski being lifted off the ground somewhat in the process. The arresting mechanism and the tail wheel assembly are then attached, completing the installation.

To illustrate suitable dimensions, weights and loading characteristics of skis as here illustrated, and also noting that the accompanying drawings are essentially scalar as to dimensions, certain considerations will be discussed as to the characteristics of skis suitable for a helicopter of some seven tons dead weight and with a three-wheel landing gear. For example, such skis are each 31.5 inches wide and 109 inches long with a runner area of 21.7 square feet per ski and with the approximate weight per ski (less rigging) being about 105 lbs., the skis being constructed of about 65% polymerizable unsaturated polyester type resin with about 35% glass fibers and with an epoxy resin runner surface. Such skis by specification are accorded a maximum recommended static load per ski of 5,100 lbs. and a maximum limit load per ski of 16,800 lbs. As will be apparent to those skilled in the art, this order of strength and relative lightness, along with the incident ease of installation and full maneuvering capability provided by the full swivel tail wheel assembly constitute an important contribution to an art where operational pay loads are traditionally quite small and operating conditions often hazardous.

From the above considerations as to various aspects of the invention, it will be readily understood that other modifications and manners of utilization of the skis can be made. Thus, by way of further example, certain adaptations of the skis to ski mounting fixed wing aircraft, either involving fixed penetration wheel assemblies or retractable landing gear wheel assemblies, can advantageously utilize the spring loaded full swivel tail wheel assembly of the invention, in order to utilize its function as to protection of the trailing tip of the ski from landing and take-off wear, as well as to enhance maneuverability of the ski equipped craft on a hard landing surface. Accordingly, these and other adaptations, modifications and utilizations of the invention will occur to those skilled in the art and are to be considered within the scope of the present invention as defined by the following claims:

What is claimed is:

1. A structurally integrated aircraft ski having a generally laterally flat runner portion and a raised pedestal portion, said aircraft ski also having a pedestal and runner surrounded landing wheel receiving well, formed by and extending through said pedestal and runner portions, said raised pedestal portion including support means for a wheel disposed in said wheel well, and said runner portion and said pedestal portion being joined only at the outer edges thereof and around said wheel well.

2. A structurally integrated aircraft ski constructed essentially of glass fiber reinforced synthetic resin having a laterally flat runner portion and a raised pedestal portion, said aircraft ski also having a landing wheel receiving well formed by and extending through said pedestal and runner portions, said pedestal portion including support means for a wheel disposed in the wheel well, and said runner portion and said pedestal portion being joined only at the outer edges thereof and around said wheel well.

3. A structurally integrated aircraft ski mountable on a landing gear wheel assembly and comprising a generally laterally flat runner surface and a raised pedestal portion, said aircraft ski also having a landing wheel receiving well extending through said pedestal and runner portions, and said runner and pedestal portions being configured to provide a hollow, enclosed interspace therebetween surrounding said wheel well.

4. A structurally integrated aircraft ski mountable on a landing gear wheel assembly and comprising a generally laterally flat runner surface and a raised pedestal portion, both enclosing a wheel well, the said runner and pedestal portions being configured to provide a hollow inner space therebetween surrounding said wheel well, wherein the portion of said ski located rearwardly of said wheel well and in line with the wheel is hollow and substantially rectangular in cross section, the pedestal portion of said section being only slightly spaced from and substantially parallel to the runner portion thereof to provide a ramp so that the aircraft wheel can be readily rolled on and off the ski without jacking of the aircraft.

5. A structurally integrated aircraft ski mountable on a fixed penetration wheel assembly and comprising a generally laterally flat runner surface and a raised pedestal portion, both enclosing a wheel well, said wheel well being formed by and extending through the runner surface and the raised pedestal portion, the said runner and pedestal portion being essentially entirely configured of thin-walled glass fiber reinforced synthetic resin and being configured to provide a hollow, enclosed interspace surrounding said wheel well.

6. A structurally integrated aircraft ski mountable on a fixed penetration wheel assembly and comprising a generally laterally runner surface and a raised pedestal portion, both enclosing a wheel well, the said runner and pedestal portion being essentially entirely configured of thin-walled glass fiber reinforced synthetic resin and being configured to provide a hollow interspace surrounding said wheel well, wherein the pedestal portion of said ski rearwardly of said wheel well is only slightly spaced from and substantially parallel to the runner to provide a ramp so that the aircraft wheel can be readily rolled on and off the ski without jacking.

7. A structurally integrated aircraft ski according to claim 6, wherein the ramp forming pedestal portion mounts in its rearward area a full swivelling, vertically spring loaded tail wheel placed rearwardly of and normally extending substantially below the runner portion of said ski.

8. A structurally integrated aircraft ski according to claim 6, wherein the rearward edge of said ski is inset centrally, and a spring-loaded full swivel tail wheel is mounted on said ramp forming pedestal portion so as to swivel in the area of said inset and normally extend substantially below the surface of said ski runner portion.

9. A structurally integrated aircraft ski comprising a wheel well in which is mountable a landing wheel, the body of said ski being constructed essentially of glass fiber reinforced synthetic resin, the configuration of said ski being with a thin-walled upper pedestal portion and a thin-walled runner portion edge bonded to said pedestal portion, the said pedestal portion being hollow and being cross-sectionally domed in most of its portion forwardly of the wheel well, with the pedestal portion rearwardly of said wheel well being centrally channeled to permit ready roll-on of the wheel into the wheel well.

10. A structurally integrated aircraft ski comprising a wheel well intermediate the ski length in which is mountable a fixed penetration landing wheel, the body of said ski being constructed essentially of glass fiber reinforced synthetic resin, the configuration of said ski being with a thin-walled upper pedestal portion and a thin-walled runner portion integrally bonded together around the runner and pedestal edges and around the wheel well, the said pedestal portion being hollow and being cross-sectionally domed in most of its portion forwardly of the wheel well, with the pedestal portion rearwardly of said wheel well being centrally channeled yet spaced slightly from the runner except at the bonded edges and at the wheel well, such channel permitting ready roll-on of the wheel into the wheel well.

11. A structurally integrated aircraft ski comprising a rearward edge with an inset, central portion, and a spring-loaded full swivel tail wheel mounted so as to swivel in the area of the inset and normally extend substantially below the running surface of said ski, at about said rearward edge.

12. A landing wheel mounted aircraft ski comprising a rearward edge with an inset, central portion and a spring loaded, full swivel tail wheel mounted so as to swivel in the area of the inset and normally extend substantially below the running surface of said ski.

13. Aircraft ski according to claim 12, constructed essentially of thin-walled glass fiber reinforced synthetic resin.

14. In combination with a pedestal type aircraft ski supportably mounting a helicopter landing wheel and having a landing wheel receiving well extending through the pedestal and runner of the ski; a small, full swiveling, spring loaded tail wheel assembly mounted in the rearward area of the ski and normally extending below the runner thereof, the landing wheel and such tail wheel effectively normally maintaining the ski from ground contact under static load and providing for as full ground maneuverability of the ski equipped landing wheel as if such were not ski equipped.

15. The combination of claim 14, wherein said tail wheel assembly comprises a rearwardly and upwardly extending leaf spring carrying a wheel block providing a pivot axis for said tail wheel which is substantially normal to the general plane of said runner surface.

16. The combination of claim 15, wherein the rear edge of said ski is centrally inset and said tail wheel is disposed to pivot in the area of said inset, the said pivot axis substantially intersecting the line of the rear edge corner portions.

17. An aircraft landing gear comprising a wheel mounted on a ski having a wheel well through which said wheel extends, the rearward end of said ski mounting a spring loaded, full swivel tail wheel having a normal disposition with its ground engaging rim extending substantially below the runner surface of said ski, the spring loading arrangement permitting upward retraction of said tail wheel under ground engaging shock to a position where such ground engaging wheel rim is substantially level with said runner surface.

References Cited in the file of this patent

UNITED STATES PATENTS

| | | |
|---|---|---|
| D. 170,194 | Green | Aug. 18, 1953 |
| 1,581,415 | Adamczik | Apr. 20, 1926 |
| 2,023,312 | De Seversky | Dec. 3, 1935 |
| 2,235,034 | Molloy | Mar. 18, 1941 |
| 2,394,826 | Trader | Feb. 12, 1946 |
| 2,532,611 | Ditter | Dec. 5, 1950 |
| 2,864,624 | Lindelof et al. | Dec. 16, 1958 |
| 2,905,410 | Bensen | Sept. 22, 1959 |
| 2,961,362 | Landes | Nov. 22, 1960 |
| 2,977,073 | Ditter | Mar. 28, 1961 |

OTHER REFERENCES

Western Aviation, August 1953, pp. 30, 31.